US009137156B2

(12) United States Patent
Kancherla et al.

(10) Patent No.: US 9,137,156 B2

(45) Date of Patent: Sep. 15, 2015

(54) SCALABLE AND EFFICIENT FLOW-AWARE PACKET DISTRIBUTION

(71) Applicant: Brocade Communications Systems, Inc., San Jose, CA (US)

(72) Inventors: Mani Kancherla, Cupertino, CA (US); Sriniwas Polavarapu, Cupertino, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 125 days.

(21) Appl. No.: 13/950,547

(22) Filed: Jul. 25, 2013

(65) Prior Publication Data

US 2014/0321462 A1 Oct. 30, 2014

Related U.S. Application Data

(60) Provisional application No. 61/815,685, filed on Apr. 24, 2013.

(51) Int. Cl.

| | |
|---|---|
| ***H04L 12/743*** | (2013.01) |
| ***H04L 12/721*** | (2013.01) |
| *H04L 12/741* | (2013.01) |

(52) U.S. Cl.

CPC ................ *H04L 45/72* (2013.01); *H04L 45/74* (2013.01)

(58) Field of Classification Search

CPC .................................................. H04L 45/7457

See application file for complete search history.

(56) References Cited

U.S. PATENT DOCUMENTS

| | | | | |
|---|---|---|---|---|
| 7,245,623 | B1 * | 7/2007 | Cheriton | 370/393 |
| 2005/0083935 | A1 * | 4/2005 | Kounavis et al. | 370/392 |
| 2008/0165778 | A1 * | 7/2008 | Ertemalp | 370/392 |

* cited by examiner

*Primary Examiner* — Gregory Sefcheck

*Assistant Examiner* — Jenkey Van

(74) *Attorney, Agent, or Firm* — Fountainhead Law Group P.C.

(57) ABSTRACT

Techniques for efficiently distributing data packets in a network device are provided. In one embodiment, the network device can store a plurality of virtual IP addresses and a plurality of real server IP addresses in an SRAM-based table. The network device can then perform a lookup into the SRAM-based table to determine whether an incoming data packet is part of a first class of data packets destined for a virtual IP address in the plurality of virtual IP addresses, or is part of a second class of data packets originating from a real server IP address in the plurality of real server IP addresses.

21 Claims, 5 Drawing Sheets

SCALABLE AND EFFICIENT FLOW-AWARE PACKET DISTRIBUTION

CROSS REFERENCES TO RELATED APPLICATIONS

The present application claims the benefit and priority under 35 U.S.C. 119(e) of U.S. Provisional Application No. 61/815,685, filed Apr. 24, 2013, entitled "SCALABLE AND EFFICIENT FLOW-AWARE PACKET DISTRIBUTION," the entire contents of which are incorporated herein by reference for all purposes.

BACKGROUND

In recent years, it has become increasingly common for network devices such as load balancers, firewalls, and the like to incorporate multiple, general purpose processing cores (e.g., Intel x86, PowerPC, or ARM-based cores) for network processing purposes. An important aspect of designing such a network device involves determining a mechanism for evenly distributing incoming data packets among the multiple processing cores of the device. By ensuring that each core is assigned a proportional share of the incoming traffic, processing bottlenecks can be avoided and the overall throughput/performance of the network device can be increased.

One approach for distributing data packets among multiple processing cores is to hash, at the packet processor level, certain key fields of an incoming data packet such as the source IP address and the destination IP address. The packet processor can then use the resulting hash value to select one of the processing cores for handling the data packet. Unfortunately, while this approach works well for distributing stateless (e.g., UDP) traffic, it does not work as well for stateful (e.g., TCP) traffic. For example, consider a typical server load balancing scenario where a load balancer receives, from a client device, a data packet that is part of a forward TCP flow destined for a virtual IP address (VIP) configured on the load balancer (i.e., the source IP address of the data packet is the client device's IP address and the destination IP address of the data packet is the VIP). If the load balancer is using a standard hash-based distribution algorithm, the load balancer will hash the data packet's source and destination IP addresses and use the hash value to distribute the packet to a particular processing core (e.g., "core 1"). As part of its processing, core 1 will access or generate TCP state information for the TCP session. The load balancer will then select a real (i.e., physical) server based on server load, perform network address translation (NAT) on the data packet to change its destination IP address from the VIP to the real server IP address, and forward the packet to the real server.

The problem with standard hash-based distribution in this scenario occurs when the real server generates a reply data packet that is part of a reverse TCP flow destined for the client device (i.e., the source IP address of the reply data packet is the real server IP address the destination IP address of the reply data packet is the client IP address). Like the forward TCP flow, upon intercepting the reply data packet, the load balancer will hash the packet's source and destination IP addresses and use the hash value to distribute the packet to a processing core. However, since the source and destination IP addresses of the reply data packet are different from the source and destination IP addresses of the data packet that originated from the client device, this hashing will result in a hash value that is different from the hash value calculated during the forward TCP flow. This, in turn, will likely cause the reply data packet to be distributed to a different processing core (e.g., "core 2") that does not have access to the same TCP state information as core 1. As a result, core 2 will not be able to perform stateful processing of the reply data packet.

To address this problem, it is possible to implement a shared memory design in the load balancer/network device that allows multiple processing cores/processors to access a single, common pool of memory. In the scenario above, this would allow core 1 and core 2 to read and write the same state information. However, the scalability of this design is usually limited by the processor architecture being used (e.g., some processor architectures may only support 2-core memory sharing, others may only support 4-core memory sharing, etc.), and thus cannot be arbitrarily scaled out by the network device vendor to meet market demands. Further, there is often a performance penalty with such shared memory designs due to synchronization mechanisms and increased memory latency.

Another solution is to leverage the ternary content addressable memory (TCAM) that is commonly included in (or implemented in conjunction with) existing packet processors to perform a rule-based hash. With this solution (referred to herein as the "TCAM-only solution"), the TCAM is populated with one entry per each VIP and each real server IP address that is configured on the load balancer/network device. Each VIP entry is associated with a rule or action that hashes the source IP address of an incoming data packet if the destination IP address matches the corresponding VIP, and each real server IP entry is associated with a rule/action that hashes the destination IP address of an incoming data packet if the source IP address matches the corresponding real server IP address. These entries essentially enable the packet processor to use the TCAM for (1) identifying a data packet as being part of a forward flow or a reverse flow of a stateful connection, and (2) hashing the common portion of the IP header that appears in both flows—namely, the client IP address (which appears in the source IP address field in the forward flow and the destination IP address field in the reverse flow). By hashing the common client IP address, data packets in the forward and reverse flows will always result in the same hash value, and thus will always be distributed to the same processing core.

Unfortunately, although the TCAM-only solution works well for both shared memory and distributed memory network devices, this solution suffers from its own scalability limitations. First, TCAM is a relatively expensive type of memory and consumes a significant amount of power. As a result, existing packet processors/network devices typically do not include large TCAMs (e.g., at most a few thousand entries). Second, the trend in newer generation packet processor designs is to reduce internal TCAM sizes even further from prior generations, as well as to eliminate support for external TCAMs. These factors will likely limit the number of TCAM entries available in network devices moving forward, which in turn will adversely affect the ability of network device vendors to scale out the TCAM-only solution. For instance, since this solution requires one TCAM entry per each VIP and each real server IP address for server load balancing, the number of VIPs and real servers that can be supported will be directly constrained by the amount of available TCAM space.

SUMMARY

Techniques for efficiently distributing data packets in a network device are provided. In one embodiment, the network device can store a plurality of virtual IP addresses and a plurality of real server IP addresses in an SRAM-based table.

The network device can then perform a lookup into the SRAM-based table to determine whether an incoming data packet is part of a first flow destined for a virtual IP address in the plurality of virtual IP addresses, or is part of a second flow originating from a real server IP address in the plurality of real server IP addresses.

The following detailed description and accompanying drawings provide a better understanding of the nature and advantages of particular embodiments.

DETAILED DESCRIPTION

Figure 1:
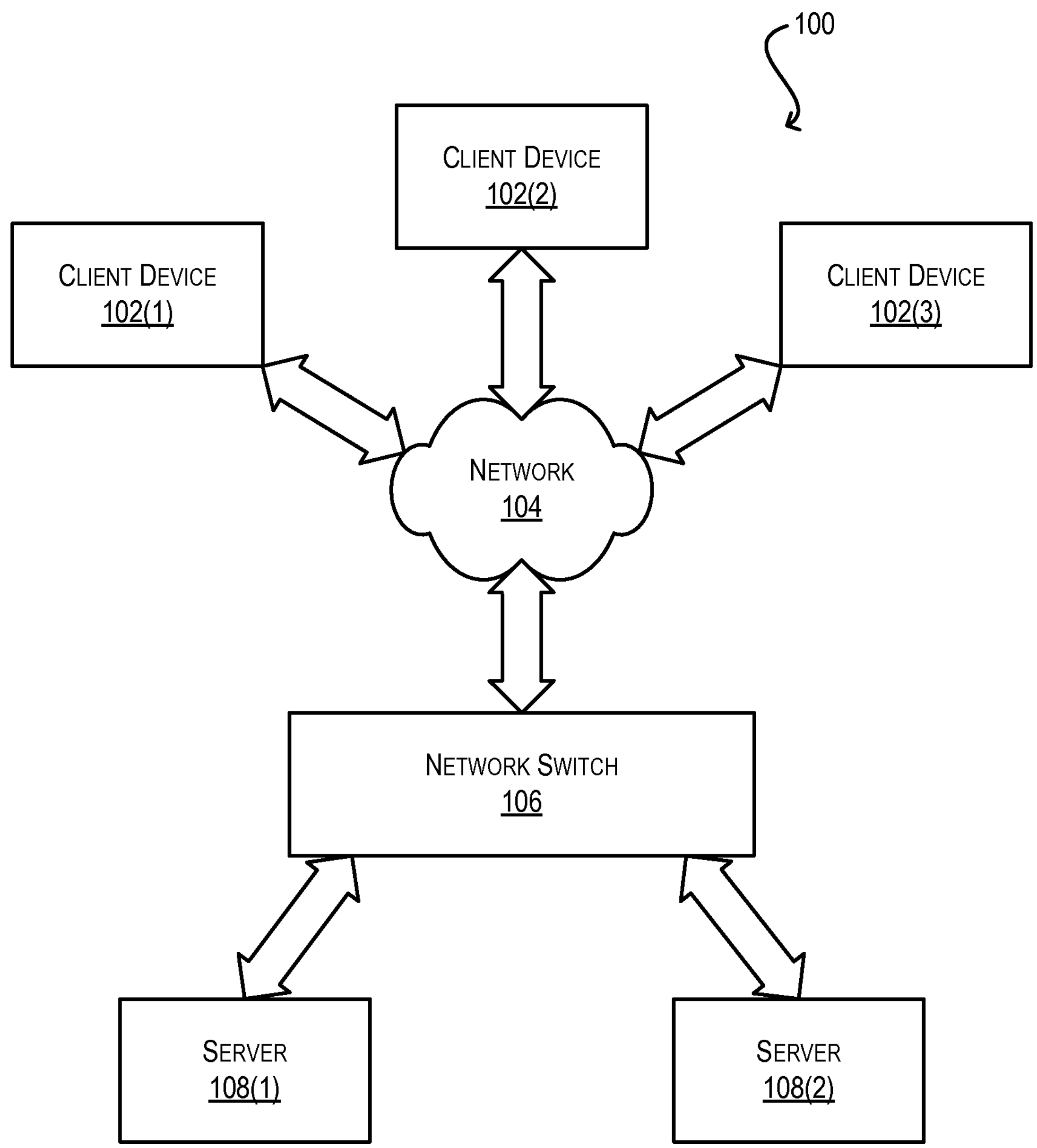
FIG. 1 depicts a system environment according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Embodiments of the present invention provide techniques that can be implemented in a network device for distributing stateful data traffic among multiple processing cores in an efficient and scalable manner. Like the TCAM-only solution described above, these techniques can use the internal and/or external TCAM accessible to the network device's packet processor to perform a rule-based hash on incoming data packets. However, rather than creating/storing one TCAM entry for each IP address that needs to be tracked in order to identify the forward or reverse flows of a stateful connection, the techniques disclosed herein can leverage a separate, static random access memory (SRAM) based table of the packet processor (e.g., an IP host or MAC table) to store these IP addresses. Within the SRAM-based table, each IP address can be mapped to a class identifier that identifies the type of the address. These class identifiers, rather than the IP addresses themselves, can then be stored in the TCAM with corresponding rules/actions for hashing certain fields of incoming packets. Since multiple IP addresses will typically map to a single class identifier, this hybrid SRAM/TCAM approach can significantly reduce the amount of TCAM space needed in comparison to the TCAM-only solution.

For example, in a server load balancing scenario, the SRAM-based table can store one entry for each VIP and each real server IP address configured on the network device. Each VIP entry in the SRAM-based table can be mapped to a VIP class identifier and each real server IP entry in the SRAM-based table can be mapped to a real server class identifier. Further, the TCAM can store two entries, regardless of the number of VIPs and real servers—a first entry that includes the VIP class identifier and a corresponding rule/action for hashing an incoming data packet's source IP address, and a second entry that includes the real server class identifier and a corresponding rule/action for hashing an incoming data packet's destination IP address.

When the network device receives a data packet, the packet processor can perform one or more initial lookups into the SRAM-based table to determine if the destination IP address of the data packet matches any VIP entry in the table (thereby indicating that the packet is part of a forward flow destined for that VIP), or if the source IP address of the data packet matches any real server IP entry in the table (thereby indicating that the packet is part of a reverse flow originating from that real server). The packet processor can then retrieve the class identifier associated with the matched entry and perform a second lookup into the TCAM using the class identifier. Based on the second lookup, the packet processor can hash the source IP address of the data packet (if the retrieved class identifier is the VIP class identifier), or hash the destination IP address of the data packet (if the retrieved class identifier is the real server class identifier). The packet processor can subsequently direct the data packet to one of the processing cores of the network device based on the resulting hash value.

With this hybrid SRAM/TCAM approach, the network device can achieve the same flow-aware packet distribution pattern as the TCAM-only solution, and thus can ensure that data packets that are part of the same stateful connection are always distributed to the same processing core of the network device. At the same time, this approach can consume only one TCAM entry per class identifier (e.g., two TCAM entries in the foregoing example). The individual IP addresses in each class (e.g., the VIPs and real server IP addresses) can be offloaded to the SRAM-based table, which will typically be much larger in size than the TCAM. As a result, embodiments of the present invention can offer substantially better scalability in situations where TCAM space is limited.

FIG. 1 depicts a system environment 100 according to an embodiment. As shown, system environment 100 includes a number of client devices 102(1), 102(2), and 102(3) that are communicatively coupled with servers 108(1) and 108(2) through a network 104 and a network switch 106. Although FIG. 1 depicts three client devices, two servers, and one network switch, any number of these entities may be supported.

Client devices 102(1)-102(3) can be end-user computing devices, such as a desktop computer, a laptop computer, a personal digital assistant, a smartphone, a tablet, or the like. In one embodiment, client devices 102(1)-102(3) can each execute (via, e.g., a standard web browser or proprietary software) a client component of a distributed software application hosted on servers 108(1) and/or 108(2), thereby enabling users of client devices 102(1)-102(3) to interact with the application.

Servers 108(1) and 108(2) can be physical computer systems (or clusters/groups of computer systems) that are configured to provide an environment in which the server component of a distributed software application can be executed. For example, servers 108(1) or 108(2) can receive a request from client device 102(1), 102(2), or 102(3) that is directed to an application hosted on the server, process the request using business logic defined for the application, and then generate information responsive to the request for transmission to the client device. In embodiments where servers 108(1) and 108(2) are configured to host one or more web applications, servers 108(1) and 108(2) can interact with one or more web server systems (not shown). These web server systems can handle the web-specific tasks of receiving Hypertext Transfer Protocol (HTTP) requests from client devices 102(1)-102(3) and servicing those requests by returning HTTP responses.

Network switch 106 is a network device that can receive and forward data packets to facilitate delivery of the data packets to their intended destinations. In a particular embodiment, network switch 106 can be an application delivery switch (also known as a "Layer 4-7 switch" or an "application delivery controller"), and thus can perform various functions to enhance the delivery of applications that are hosted on servers 108(1)-108(2) and consumed by client devices 102(1)-102(3). For instance, network switch 106 can perform server load balancing, Layer 4-7 traffic redirection, automated failover, TCP connection multiplexing, server offload functions (e.g., SSL acceleration and TCP connection management), data compression, security functions (e.g., Denial of Service (DOS) and TCP SYN attack prevention), and more. In certain embodiments, network switch 106 can also provide integrated Layer 2/3 functionality.

To support the foregoing features, network switch 106 can be configured with (1) one or more virtual IP addresses (VIPs) that correspond to the applications hosted on servers 108(1) and 108(2), and (2) the IP addresses of servers 108(1) and 108(2) (which are considered "real," or physical, servers). Upon receiving a data packet from, e.g., client device 102(1) that is destined for a particular VIP, network switch 106 can perform appropriate Layer 4-7 processing on the data packet, change the destination IP address of the packet from the VIP to the IP address of a real server (e.g., either server 108(1) or 108(2)) via NAT, and then forward the packet to the real server. Conversely, upon intercepting a reply data packet from the real server that is destined for client device 102(1), network switch 106 can perform appropriate Layer 4-7 processing on the reply data packet, change the source IP address of packet from the real server IP address to the VIP via NAT, and then forward the packet to client device 102(1).

It should be appreciated that system environment 100 is illustrative and is not intended to limit embodiments of the present invention. For example, the various entities depicted in system environment 100 can have other capabilities or include other components that are not specifically described. One of ordinary skill in the art will recognize many variations, modifications, and alternatives.

Figure 2:
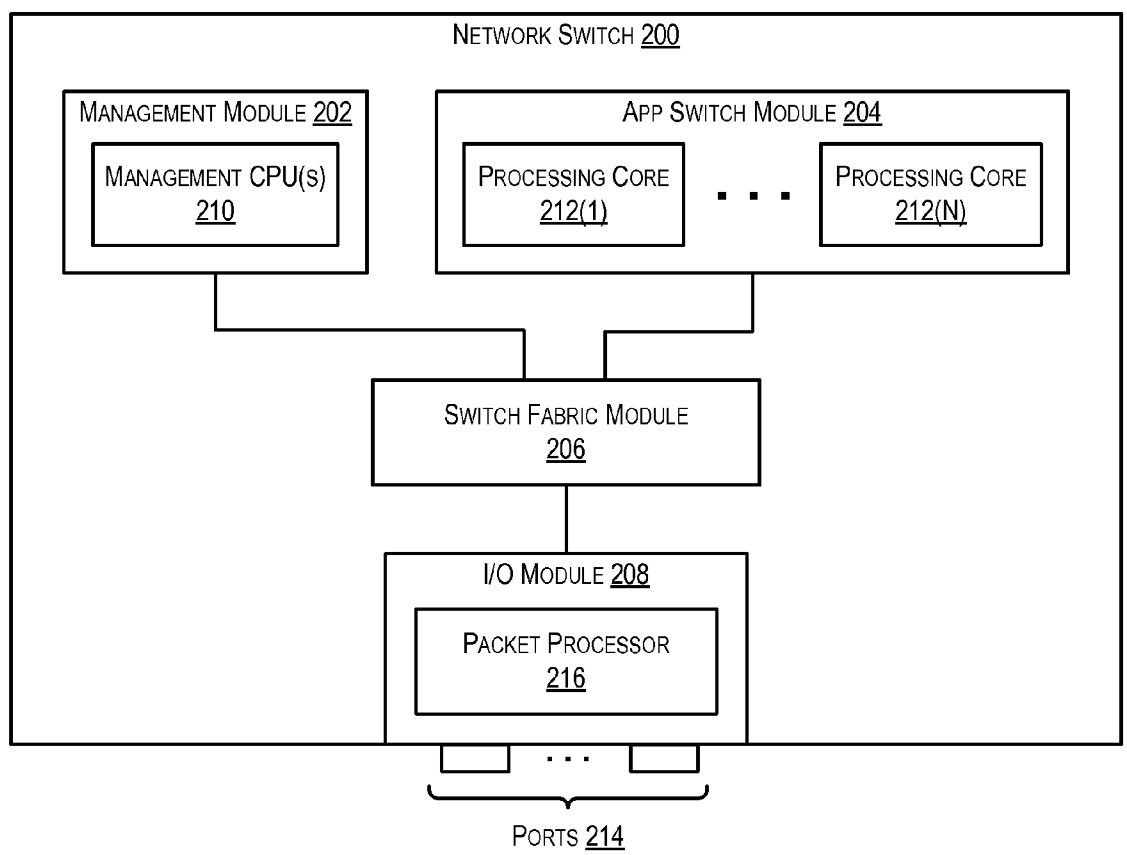
FIG. 2 depicts a network switch according to an embodiment.

FIG. 2 depicts an exemplary network switch 200 that can be used to implement switch 106 of FIG. 1 according to an embodiment. As shown, network switch 200 includes a management module 202, an application switch module 204, a switch fabric module 206, and an I/O module 208. Although FIG. 2 depicts one of each of these modules, any number of these components can be supported. For example, modules 202-208 can each be implemented as a blade that is insertable into (or removable from) one of a plurality of modular slots in the chassis of network switch 200. In this manner, network switch 200 can accommodate any number of these modules according to differing network topologies and switching requirements.

Management module 202 represents the control plane of network switch 200 and includes one or more management processors 210 that execute the management/control functions of network switch 200. Management processor 210 can be a general purpose CPU, such as a PowerPC, Intel, AMD, or ARM microprocessor, that operates under the control of software stored in an associated memory (not shown).

Application switch module 204, which is part of the data plane of network switch 200, includes a plurality of processing cores 212(1)-212(N). Like management processor 210, processing cores 212(1)-212(N) can correspond to general purpose CPUs (or cores within a larger, multi-core CPU) that operate under the control of software stored in an associated memory. In various embodiments, processing cores 212(1)-212(N) can carry out the Layer 4-7 functions attributed to network switch 106 in FIG. 1.

Switch fabric module 206 and I/O module 208 are also part of the data plane of network switch 200. Switch fabric module 206 is configured to interconnect the other modules of network switch 200. I/O module 208 (also known as a line card) includes one or more input/output ports 214 that are used by network switch 200 to send and receive data packets. These ports can send and receive various types of data traffic at different speeds including 1 Gigabit per second, 10 Gigabits per second, 40 Gigabits per second, or 100 Gigabits per second. I/O module 208 also includes a packet processor 216. Packet processor 216 is a specialized hardware component (e.g., an FPGA or ASIC) that can make wire speed decisions on how to handle incoming or outgoing data packets. In a particular embodiment, packet processor 216 can determine whether an incoming data packet should be sent to application switch module 204 for Layer 4-7 processing, and if so, can direct the packet to one of processing cores 212(1)-212(N).

As noted in the Background section, one way in which packet processor 216 can distribute incoming data packets among processing cores 212(1)-212(N) is to hash the source and destination IP addresses of each packet and use the resulting hash value to select a processor core. However, this standard hashing mechanism is not flow-aware, and thus does not work well for distributing data traffic that requires stateful processing.

An alternative approach is the TCAM-only solution, which enables packet processor 216 to leverage an internal or external TCAM to distribute all of the data packets in the forward/reverse flows of a stateful connection to the same processing core (thereby ensuring that the processing core has access to the requisite state information). However, this solution requires a relative large number of TCAM entries (e.g., one TCAM entry for each VIP and one TCAM entry for each real server IP address). Thus, the TCAM-only solution is inherently limited by the size of packet processor 216's TCAM, which has traditionally been relatively small and furthermore has decreased in size in newer packet processor designs.

With some packet processors, it is possible to attach an external TCAM via a high-speed bus. Such external TCAMs are generally larger in size than TCAMs that are internal to a packet processor. However, as the throughput of packet processors continue to increase, the bandwidth of the bus on which the external TCAM is attached can become a bottleneck. Thus, external TCAMs do not provide a viable solution for increasing available TCAM space on newer packet processors that support very high data throughput rates.

Figure 3:
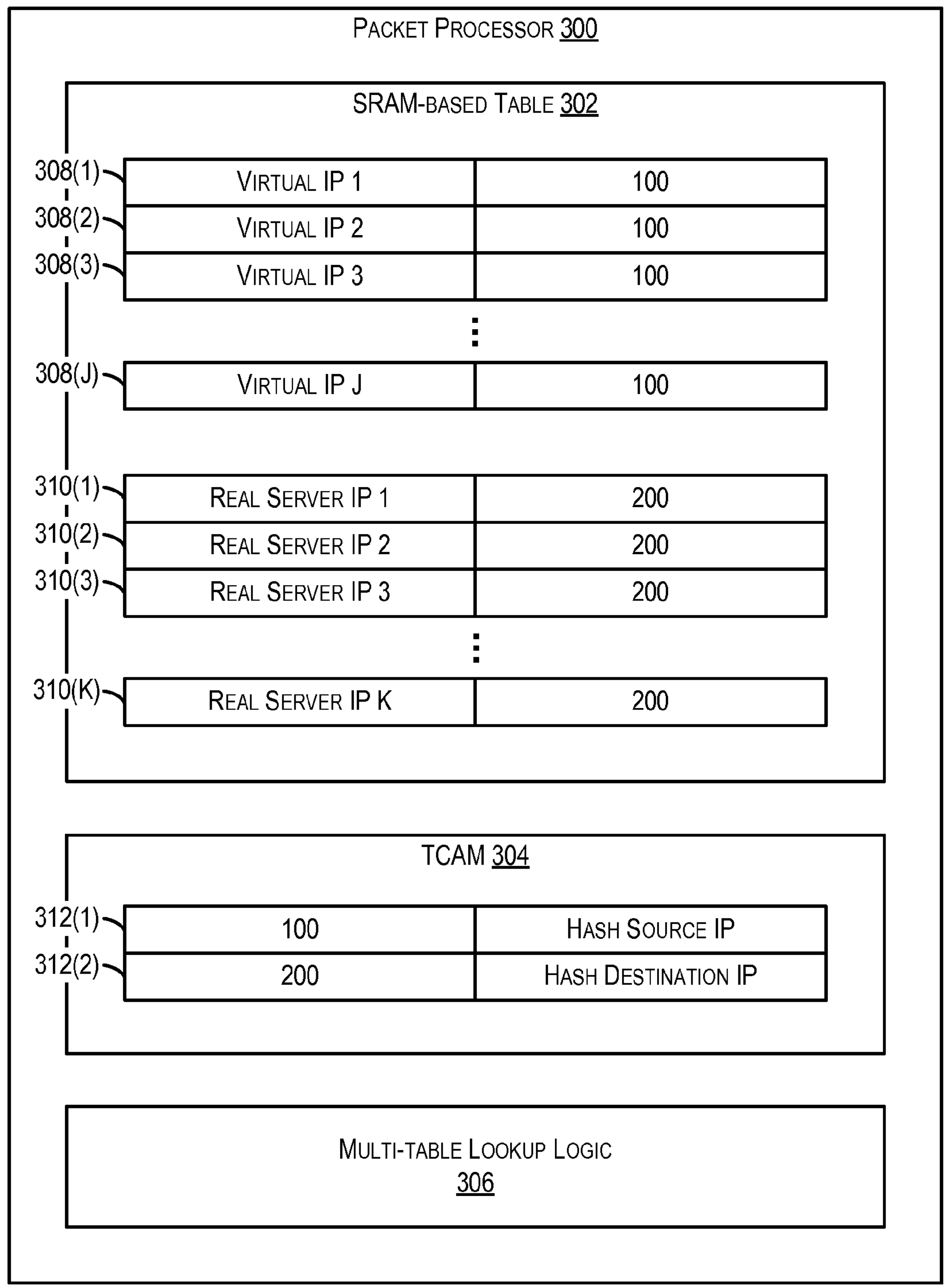
FIG. 3 depicts a packet processor according to an embodiment.

To address the deficiencies of the TCAM-only solution, FIG. 3 depicts a packet processor 300 that supports a hybrid SRAM/TCAM-based distribution approach according to an embodiment. In various embodiments, packet processor 300 can be used to implement packet processor 216 of network switch 200.

As shown, packet processor 300 can store, in an internal SRAM-based table 302 (e.g., an IP host or MAC table), a plurality of entries 308(1)-308(J) that correspond to the VIPs configured on network switch 200 and a plurality of entries 310(1)-310(K) that correspond to the real server IP addresses configured on network switch 200. Each entry 308(1)-308(J) can include a unique VIP and a preconfigured VIP class identifier (e.g., 100), while each entry 310(1)-310(K) can include a unique real server IP address and a preconfigured real server class identifier (e.g., 200).

In addition, packet processor 300 can store, in a TCAM 304, a first entry 312(1) that includes the VIP class identifier (100) and a corresponding rule/action to hash an incoming data packet's source IP address, and a second entry 312(2) that includes the real server class identifier (200) and a corresponding rule/action to hash an incoming data packet's destination IP address.

At the time of receiving a data packet, packet processor 300 can perform, via a multi-table lookup logic component 306, one or more first lookups into SRAM-based table 302 to determine whether the destination IP address of the packet matches one of the VIPs in entries 308(1)-308(J), or whether the source IP address of the packet matches one of the real server IP addresses in entries 310(1)-310(K). In this way, packet processor 300 can determine whether the data packet is part of a forward flow or a reverse flow of a stateful connection. Packet processor 300 can then retrieve the class identifier for the matched entry (either 100 or 200).

Upon retrieving the class identifier, packet processor 300 can perform, via multi-table lookup logic component 306, a second lookup into TCAM 304 in order to determine the appropriate hash rule/action to apply for that class of packets. For example, if the retrieved class identifier is 100, packet processor 300 can match entry 312(1) in TCAM 304, which indicates that the source IP address of the packet should be hashed. On the other hand, if the retrieved class identifier is 200, packet processor 300 can match entry 312(2) in TCAM 304, which indicates that the destination IP address of the packet should be hashed. Packet processor 300 can then apply the hash rule/action, generate a hash value, and use the hash value to select a processing core 212(1)-212(N) for handling the data packet.

The hybrid SRAM/TCAM approach shown in FIG. 3 provides a number of advantages over prior art packet distribution techniques. First, unlike standard hash-based distribution, packet processor 300 can identify whether an incoming data packet is part of a forward flow or a reverse flow of a stateful connection (via the lookup(s) into SRAM-based table 302) and can hash the portion of the packet header that is common to both flows (via the lookup into TCAM 304). Thus, packet processor 300 can distribute data packets that require common state information to the same processing core of the network device, while maintaining core diversity across different stateful connections.

Second, unlike the TCAM-only solution, the hybrid SRAM/TCAM approach of FIG. 3 does not require one TCAM entry per each VIP or real server IP address configured on the network device. Instead, the hybrid SRAM/TCAM approach merely consumes a single TCAM entry per class identifier. For instance, in FIG. 3, TCAM 304 only contains two entries (one VIP class ID entry and one real server ID entry) for J VIPs and K real servers. By collapsing multiple TCAM IP entries into a single TCAM class entry in this manner, the scheme of FIG. 3 can allow for significantly more scalability in situations where the size of TCAM 304 is limited.

It should be noted that the embodiment of FIG. 3 contemplates a server load balancing scenario, and thus includes exemplary SRAM and TCAM entries for the two classes of IP addresses—VIPs and real server IP addresses—that are relevant in that scenario. In alternative embodiments, the entries stored in SRAM-based table 302 and TCAM 304 may correspond to other classes of IP addresses that serve as the basis for identifying stateful flows in alternative scenarios. Further, the class entries of TCAM 304 may specify other types of hash rules/actions. One of ordinary skill in the art will recognize many variations, modifications, and alternatives.

It should also be noted that, in some cases, SRAM-based table 302 may be a Layer 3 table (e.g., an IP host table), and thus multi-table lookup logic component 306 of packet processor 300 may not have been originally designed to perform the first lookup(s) into SRAM-based table 302 described above for non-Layer 3 traffic. This can be problematic if the data traffic to be distributed across processing cores 212(1)-212(N) includes, e.g., Layer 2 traffic. To address this, in certain embodiments packet processor 300 can be enhanced with a mechanism (e.g., a configurable control bit) that causes multi-table lookup logic component 306 to always perform the first lookup(s) into SRAM-based table 302, regardless of the nature of the incoming data packets (e.g., Layer 2, Layer3, etc.).

Figure 4:
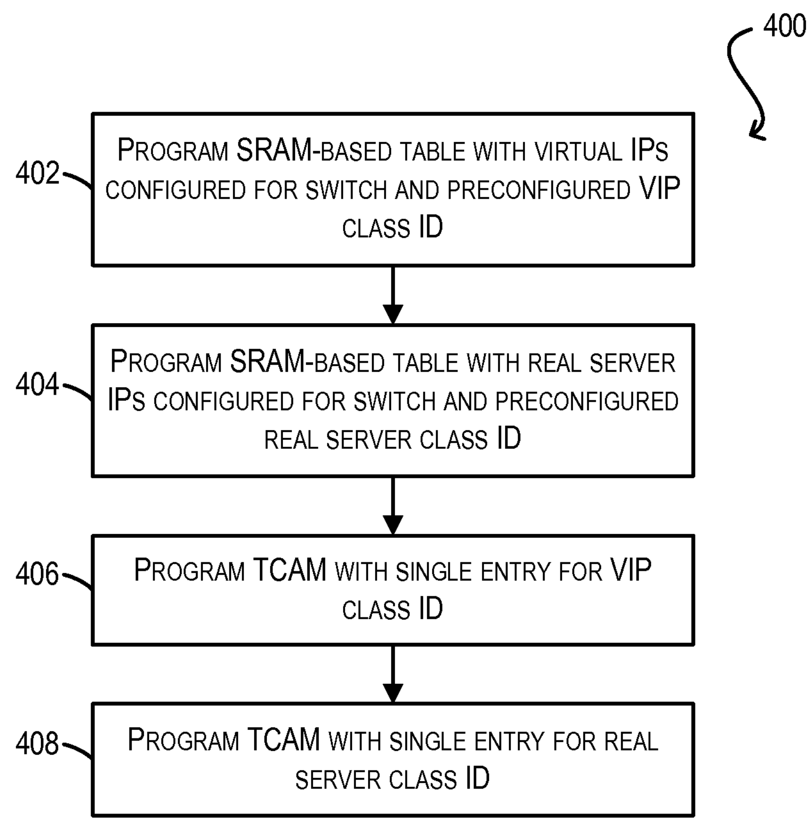
FIG. 4 depicts a process for programming the TCAM and SRAM tables of a packet processor according to an embodiment.

FIG. 4 depicts a process 400 for populating SRAM-based table 302 and TCAM 304 of FIG. 3 according to an embodiment. Process 400 can be performed by, e.g., management processor 202 upon initialization of network device 200 or in response to one or more user configuration commands.

At block 402, management processor 202 can program SRAM-based table 302 with entries that identify the VIPs configured on network switch 200 and a preconfigured VIP class identifier. For example, this programming can result in the creation of entries 308(1)-308(J) shown in FIG. 3.

At block 404, management processor 202 can program SRAM-based table 302 with entries that identify the real server IP addresses configured on network switch 200 and a preconfigured real server class identifier. For example, this programming can result in the creation of entries 310(1)-310(K) shown in FIG. 3.

At block 406, management processor 202 can program TCAM 304 with a single entry that identifies the VIP class identifier and a corresponding hash rule/action (e.g., entry 312(1) of FIG. 3).

Finally, at block 408, management processor 202 can program TCAM 304 with a single entry that identifies the real server class identifier and a corresponding hash rule/action (e.g., entry 312(2) of FIG. 3).

Figure 5:
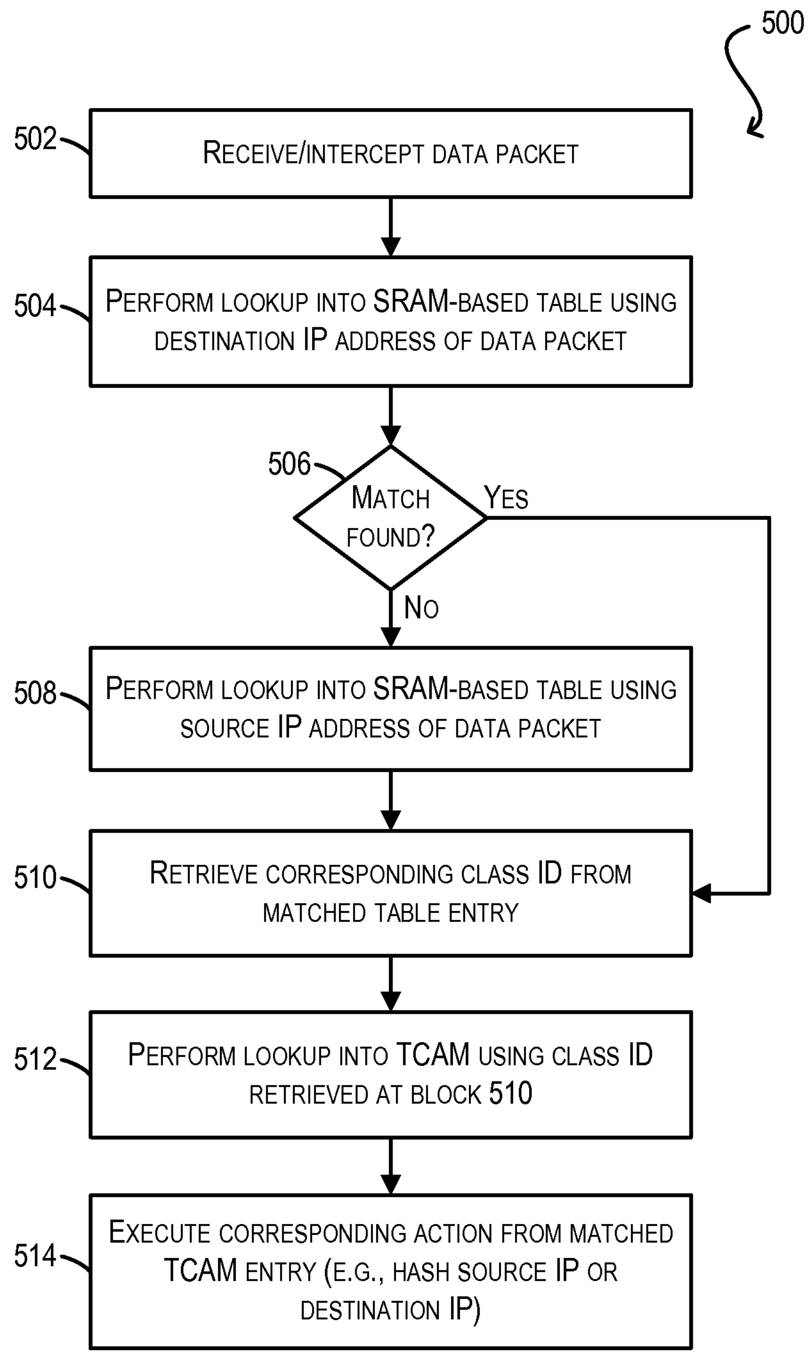
FIG. 5 depicts a process for distributing an incoming data packet to one of a plurality of processing cores according to an embodiment.

FIG. 5 depicts a process 500 that can be performed by packet processor 300 for distributing an incoming data packet to a processing core 212(1)-212(N) of network device 200 according to an embodiment. Process 500 represents an exemplary flow for implementing the hybrid SRAM/TCAM-based distribution approach discussed with respect in FIG. 3.

At block 502, packet processor 300 can receive/intercept a data packet (e.g., a Layer 2 or Layer 3 packet). In one embodiment, the data packet can be part of a forward flow in a stateful connection (e.g., a TCP session) and thus can originate from a client device (e.g., client device 102(1)-102(3)) and be destined for a VIP configured on network switch 200. In another embodiment, the data packet can be part of a reverse flow in a stateful connection and thus can originate from a real server (e.g., server 108(1) or 108(2))) and can be destined for a client device (e.g., client device 102(1)-102(3)).

At block 504, multi-table lookup logic component 306 of packet processor 300 can perform a lookup into SRAM-based table 302 using the destination IP address of the data packet. In this way, packet processor 300 can determine whether the data packet is part of a forward flow destined for one of the VIPs defined in table 302. If the lookup at block 504 results in a match (block 506), multi-table lookup logic component 306 can retrieve the corresponding VIP class identifier from the matched table entry (block 510).

Otherwise, multi-table lookup logic component 306 can perform another lookup into SRAM-based table 302 using the source IP address of the data packet (block 508). In this way, packet processor 300 can determine whether the data packet is part of a reverse flow originating from one of the real servers defined in table 302. Assuming the lookup at block 508 results in a match, multi-table lookup logic component 306 can retrieve the corresponding real server class identifier from the matched table entry (block 510).

At block 512, multi-table lookup logic component 306 can perform a lookup into TCAM 304 using the class identifier retrieved at block 510. Packet processor 300 can then execute the hash rule/action for the matched TCAM entry (block 514). For example, if the retrieved class identifier is the VIP class identifier (e.g., 100), packet processor 300 can hash the source IP address of the data packet per entry 312(1) of FIG. 3. On the other hand, if the retrieved class identifier is the real server class identifier (e.g. 200), packet processor 300 can hash the destination IP address of the data packet per entry 312(2) of FIG. 3. These hash rules/actions ensures that all data packets that are part of the same stateful connection (e.g., packets that originate from a particular client IP address in the forward flow and are destined for the same client IP address in the reverse flow) result in the same hash value.

Finally, although not shown, packet processor 300 can use the hash value to select a processing core 212(1)-212(N) and can forward the data packet to the selected core for handling.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:

storing, by a network device, a plurality of virtual IP addresses and a plurality of real server IP addresses in an SRAM-based table, wherein each virtual IP address is associated with a first class identifier in the SRAM-based table, and wherein each real server IP address is associated with a second class identifier in the SRAM-based table;

storing, by the network device, exactly one entry in a ternary content addressable memory (TCAM) that identifies the first class identifier and a first action;

storing, by the network device, exactly one entry in the TCAM that identifies the second class identifier and a second action;

performing, by the network device, a first lookup into the SRAM-based table in response to an incoming data packet, wherein performing the first lookup comprises:

if a destination IP address of the incoming data packet matches a virtual IP address in the SRAM-based table, retrieving the first class identifier; and if a source IP address of the incoming data packet matches a real server IP address in the SRAM-based table, retrieving the second class identifier; and performing, by the network device, a second lookup into the TCAM using the retrieved first class identifier or the retrieved second class identifier, wherein performing the second lookup comprises:

if the first class identifier was retrieved, matching the exactly one entry in the TCAM that identifies the first class identifier and executing the first action; and if the second class identifier was retrieved, matching the exactly one entry in the TCAM that identifies the second class identifier and executing the second action.

2. The method of claim 1 wherein the first action corresponds to an action for hashing the source IP address of the incoming data packet.

3. The method of claim 2 wherein the second action corresponds to an action for hashing the destination IP address of the incoming data packet.

4. The method of claim 3 wherein performing the second lookup further comprises, if the first class identifier was retrieved:

directing the incoming data packet to one of a plurality of processing cores in the network device based on the hashing of the source IP address.

5. The method of claim 4 wherein performing the second lookup further comprises, if the second class identifier was retrieved:

directing the incoming data packet to one of the plurality of processing cores in the network device based on the hashing of the destination IP address.

6. The method of claim 1 wherein the SRAM-based table is a Layer 3 (L3) table implemented in a packet processor of the network device.

7. The method of claim 6 wherein the incoming data packet is a Layer 2 (L2) data packet.

8. The method of claim 7 further comprising, prior to performing the first lookup:

determining whether a control bit associated with the SRAM-based table is set, the control bit indicating whether incoming non-Layer 3 traffic should be processed using the SRAM-based table; and if the control bit is set, performing the first lookup.

9. The method of claim 1 wherein the network device an application delivery switch.

10. A network device comprising:

a packet processor operable to:

store a plurality of virtual IP addresses and a plurality of real server IP addresses in an SRAM-based table of the packet processor, wherein each virtual IP address is associated with a first class identifier in the SRAM-based table, and wherein each real server IP address is associated with a second class identifier in the SRAM-based table;

store exactly one entry in a ternary content addressable memory (TCAM) that identifies the first class identifier and a first action;

store exactly one entry in the TCAM that identifies the second class identifier and a second action;

perform a first lookup into the SRAM-based table in response to an incoming data packet, wherein performing the first lookup comprises:

if a destination IP address of the incoming data packet matches a virtual IP address in the SRAM-based table, retrieving the first class identifier; and if a source IP address of the incoming data packet matches a real server IP address in the SRAM-based table, retrieving the second class identifier; and perform a second lookup into the TCAM using the retrieved first class identifier or the retrieved second class identifier, wherein performing the second lookup comprises:

if the first class identifier was retrieved, matching the exactly one entry in the TCAM that identifies the first class identifier and executing the first action; and if the second class identifier was retrieved, matching the exactly one entry in the TCAM that identifies the second class identifier and executing the second action.

11. The network device of claim 10 wherein the first action corresponds to an action for hashing the source IP address of the incoming data packet.

12. The network device of claim 11 wherein the second action corresponds to an action for hashing the destination IP address of the incoming packet.

13. The network device of claim 12 wherein performing the second lookup further comprises, if the first class identifier was retrieved:

directing the incoming data packet to one of a plurality of processing cores in the network device based on the hashing of the source IP address.

14. The network device of claim 13 wherein performing the second lookup further comprises, if the second class identifier was retrieved:

directing the incoming data packet to one of the plurality of processing cores in the network device based on the hashing of the destination IP address.

15. The network device of claim 10 wherein the incoming data packet is a Layer 2 (L2) data packet, and wherein the packet processor is further operable to, prior to performing the first lookup:

determine whether a control bit associated with the SRAM-based table is set, the control bit indicating whether incoming non-Layer 3 traffic should be processed using the SRAM-based table; and if the control bit is set, perform the first lookup.

16. A non-transitory computer readable medium having stored thereon program code executable by a processor of a network device, the program code comprising:

code that causes the processor to store a plurality of virtual IP addresses and a plurality of real server IP addresses into an SRAM-based table of the network device, wherein each virtual IP address is associated with a first class identifier in the SRAM-based table, and wherein each real server IP address is associated with a second class identifier in the SRAM-based table;

code that causes the processor to store exactly one entry in a ternary content addressable memory (TCAM) of the network device that identifies the first class identifier and a first action;

code that causes the processor to store exactly one entry in the TCAM that identifies the second class identifier and a second action;

code that causes the processor to perform a first lookup into the SRAM-based table in response to an incoming data packet, wherein performing the first lookup comprises:

if a destination IP address of the incoming data packet matches a virtual IP address in the SRAM-based table, retrieving the first class identifier; and if a source IP address of the incoming data packet matches a real server IP address in the SRAM-based table, retrieving the second class identifier; and code that causes the processor to perform a second lookup into the TCAM using the retrieved first class identifier or the retrieved second class identifier, wherein performing the second lookup comprises:

if the first class identifier was retrieved, matching the exactly one entry in the TCAM that identifies the first class identifier and executing the first action; and if the second class identifier was retrieved, matching the exactly one entry in the TCAM that identifies the second class identifier and executing the second action.

17. The non-transitory computer readable medium of claim 16 wherein the first action corresponds to an action for hashing the source IP address of the incoming data packet.

18. The non-transitory computer readable medium of claim 17 wherein the second action corresponds to an action for hashing the destination IP address of the incoming packet.

19. The non-transitory computer readable medium of claim 18 wherein performing the second lookup further comprises, if the first class identifier was retrieved:

directing the incoming data packet to one of a plurality of processing cores in the network device based on the hashing of the source IP address.

20. The non-transitory computer readable medium of claim 19 wherein performing the second lookup further comprises, if the second class identifier was retrieved:

directing the incoming data packet to one of the plurality of processing cores in the network device based on the hashing of the destination IP address.

21. The non-transitory computer readable medium of claim 16 wherein the incoming data packet is a Layer 2 (L2) data packet, and wherein the program code further comprises:

code that, prior to performing the first lookup, causes the processor to determine whether a control bit associated with the SRAM-based table is set, the control bit indicating whether incoming non-Layer 3 traffic should be processed using the SRAM-based table; and code causes the processor to perform the first lookup if the control bit is set.

* * * * *